United States Patent Office 2,834,800
Patented May 13, 1958

2,834,800

ACRYLIC ACID COMPOUNDS

Walter B. Trapp and Donald E. Pletcher, Midland, Mich., assignors to The Dow Chemical Company, Midland, Mich., a corporation of Delaware No Drawing. Application August 17, 1956
Serial No. 604,601

5 Claims. (Cl. 260—464)

This invention is concerned with cyclohexeneacrylic acid compounds having the structure

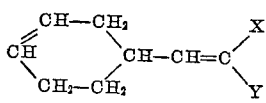

In this and succeeding formulae, X represents a radical selected from the group consisting of cyano and carbalkoxyl containing from 2 to 5 carbon atoms, inclusive; and Y represents a radical selected from the group consisting of cyano, carboxyl and carbalkoxyl radicals containing from 2 to 5 carbon atoms, inclusive. The products of this invention are light colored liquids or solids generally soluble in organic solvents such as benzene, ethanol, acetone and alcohol and substantially insoluble in water. These compounds are useful as parasiticides particularly adapted to be employed as toxic constituents of fungicidal and bactericidal preparations. In addition, these compounds may be employed as herbicides for the control of undesired vegetation.

The new cyclohexeneacrylic acid compounds may be prepared by causing a 3-cyclohexene-1-carboxaldehyde to react with a compound containing an active methylene group and represented by the formula

to produce the desired product and water of reaction.

In the synthesis, good results are obtained when substantially equimolar proportions of the reactants are employed. The reaction is carried out in the presence of a basic catalyst and takes place smoothly in the temperature range of from 10° to 110° C. with the formation of the cyclohexeneacrylic acid product and water of reaction. Suitable catalysts include piperidine, trimethylamine and metal hydroxides. A reaction solvent such as benzene, toluene and pyridine may be employed, if desired.

In carrying out the reaction, 3-cyclohexene-1-carboxaldehyde and the appropriate acid derivative are mixed together in the presence of a catalyst and a solvent, if employed. The mixture is then heated for a period of 2 to 20 hours to complete the reaction. In the preferred method, benzene is employed to remove the water of reaction by azeotropic distillation from the reaction mixture as it is formed. After completion of the reaction, the desired product may be isolated by distillation or crystallization.

When the products are acids having the structure

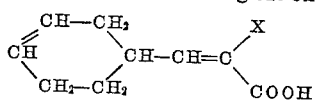

the reaction mixture is allowed to cool to precipitate the acrylic acid product and the latter recovered by filtration. The product may be purified by recrystallization.

When the products are acid derivatives having the structure

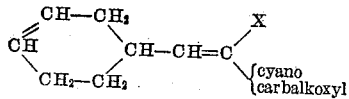

the reaction mixture is fractionally distilled to obtain the desired product.

The following examples illustrate the invention but are not to be construed as limiting.

*Example 1.—α-Cyano-3-cyclohexene-1-acrylic acid*

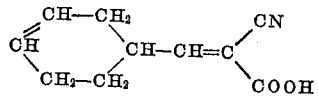

220 grams (2 moles) of 3-cyclohexene-1-carboxaldehyde, 170 grams (2 moles) of cyanoacetic acid, 180 milliliters of benzene and 2 milliliters of piperidine were mixed together and the mixture heated for approximately 7 hours. During the heating, a reaction took place with the formation of α-cyano-3-cyclohexene-1-acrylic acid and water of reaction. The latter was distilled off as a benzene-water azeotrope. After completion of the heating, the mixture was allowed to cool to precipitate an α-cyano-3-cyclohexene-1-acrylic acid as a crystalline solid. The latter was recovered by filtration and recrystallized from benzene to obtain a purified product melting at 119°–121° C.

*Example 2.—Ethyl α-cyano-3-cyclohexene-1-acrylate*

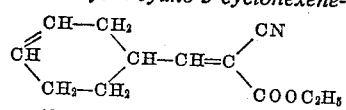

220 grams (2 moles) of 3-cyclohexene-1-carboxaldehyde was added portionwise to a mixture of a few drops of piperidine catalyst in 274 grams (2 moles) of ethyl cyanoacetate at a rate to maintain the temperature below 20° C. During the addition, the mixture became cloudy due to the formation of water of reaction. 100 milliliters of benzene was added thereto and the resulting mixture heated in such a manner to allow the benzene to reflux and the water to be removed as a benzene-water azeotrope. The refluxing was continued for 7 to 8 hours to complete the removal of the theoretical quantity of water. The mixture was heated to strip off the residual benzene and the residue fractionally distilled to obtain an ethyl α-cyano-3-cyclohexene-1-acrylate product boiling at 124°–125° C. at 2.8 millimeters pressure. The yield of the product amounted to 391 grams or 95.5 percent of theoretical. After redistillation and repeated recrystallization from methanol, the purified product had a melting point of 47.5°–48.6° C. The product had an analytical value for nitrogen of 6.62 percent. The theoretical value is 6.83 percent.

*Example 3.—Diethyl (3-cyclohexen-1-ylmethylene) malonate*

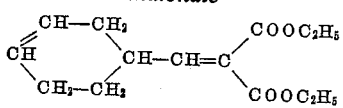

220 grams (2 moles) of 3-cyclohexene-1-carboxaldehyde was added to a mixture of a few drops of piperidine in 320 grams (2 moles) of diethyl malonate. 200 milliliters of benzene was added to the mixture and the resulting mixture heated to allow the benzene to reflux and the water of reaction to distill off as a benzene-water azeotrope. The formation of the water of reaction took place slowly and additional small portions of piperidine were periodically added to the heated mixture. The heating process and piperidine addition were carried out over a period of 3 days. Thereafter the mixture was distilled to remove the benzene, piperidine and unreacted starting materials and to obtain a diethyl (3-cylohexen-1-ylmethylene)malonate product. Upon redistillation, the latter product was obtained as a liquid boiling at 145°–146° C. at 4 millimeters pressure. The purified product had a refractive index, $n_D^{25° C.}$ of 1.479 and a specific grivity of 1.049 at 25° C./4° C. Elemental analyses gave values of 66.89 percent carbon and 8.05 percent hydrogen. The theoretical values are 66.64 percent and 7.99 percent, respectively.

*Example 4.—(3-cyclohexen-1-ylmethylene)malononitrile*

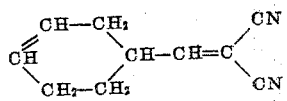

220 grams (2 moles) of 3-cyclohexene-1-carboxaldehyde, 132 grams (2 moles) of malononitrile, 180 milliliters of benzene and 2 milliliters of piperidine are mixed together and the mixture heated for approximately 7 hours. During the heating a reaction takes place with the formation of the desired product and water of reaction. The latter is distilled off as a benzene-water azeotrope to obtain as residue a (3-cyclohexen-1-ylmethylene)-malononitrile having a molecular weight of 158.

*Example 5*

In reactions carried out in a manner similar to that described in Example 2, the following esters are prepared:

Normal-butyl α-cyano-3-cyclohexene-1-acrylate having a molecular weight of 233 by the reaction of 3-cyclohexene-1-carboxaldehyde and normal-butyl cyanoacetate.

Isopropyl α-cyano-3-cyclohexene-1-acrylate having a molecular weight of 219 by the reaction of 3-cyclohexene-1-carboxaldehyde and isopropyl cyanoacetate.

Methyl α-cyano-3-cyclohexene-1-acrylate having a molecular weight of 191 by the reaction of 3-cyclohexene-1-carboxaldehyde and methyl cyanoacetate.

*Example 6*

In reactions carried out in a manner similar to that described in Example 3, the following esters are prepared:

Dimethyl (3-cyclohexen-1-ylmethylene)malonate having a molecular weight of 224 by the reaction of 3-cyclohexene-1-carboxaldehyde and dimethyl malonate.

Diisopropyl (3-cyclohexen-1-ylmethylene)malonate having a molecular weight of 280 by the reaction of 3-cyclohexene-1-carboxaldehyde and diisopropyl malonate.

Di-secondary-butyl (3-cyclohexen-1-ylmethylene)malonate having a molecular weight of 308 by the reaction of 3-cyclohexene-1-carboxaldehyde and di-secondary-butyl malonate.

*Example 7*

In a reaction carried out as described in Example 1, monoethyl (3-cyclohexen-1-ylmethylene)malonate having a molecular weight of 224 is prepared by the reaction of 3-cyclohexene-1-carboxaldehyde and monomethyl malonate.

The products of this invention are useful as fungicides and bactericides. In a representative operation, nutrient agar media containing 0.5 percent by weight of α-cyano-3-cyclohexene-1-acrylic acid gave complete inhibition of growth of the organisms *Staphylococcus aureus* and *Aspergillus terreus* when incubated at 30° C. for 4 days. The new compounds are also useful as herbicides for the control of undesirable vegetation. For example, complete control of rape (*Brassica napus*) and canary grass (*Phalaris canariensis*) were obtained when foliage was sprayed with compositions containing 0.05 gram of diethyl (3-cyclohexen-1-ylmethylene)malonate per 100 milliliters of aqueous dispersion.

The 3-cyclohexene-carboxaldehyde employed as reactant may be prepared by heating together under pressure a mixture of acrolein and butadiene in the presence of a polymerization inhibitor such as 4-tertiary-butylcatechol until a pressure drop is noted. The reaction mixture may then be distilled to obtain the desired 3-cyclohexene-1-carboxaldehyde having a boiling point of 55° C. at 15 millimeters pressure and a refractive index, $n_D^{25°C.}$ of 1.470.

We claim:

1. A compound having the structure

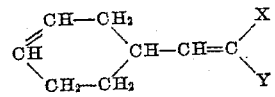

wherein X represents a radical selected from the group consisting of cyano and carbalkoxyl containing from 2 to 5 carbon atoms, inclusive; and Y represents a radical selected from the group consisting of cyano, carboxyl and carbalkoxyl radicals containing from 2 to 5 carbon atoms, inclusive.

2. α-Cyano-3-cyclohexene-1-acrylic acid.
3. Ethyl α-cyano-3-cyclohexene-1-acrylate.
4. Diethyl (3-cyclohexen-1-ylmethylene)malonate.
5. (3-cyclohexen-1-ylmethylene)malononitrile.

References Cited in the file of this patent

UNITED STATES PATENTS 2,683,659    Schlesinger et al. _____ July 13, 1954
2,759,011    Soloway _____ Aug. 14, 1956

OTHER REFERENCES

Andrews et al.: Jour. Amer. Chem. Soc., vol. 67, pp. 715-19 (1945).

Stefanovic et al.: Chem. Abst., vol. 47, col. 8685 (1953).